United States Patent
Tsukamoto

(10) Patent No.: US 7,646,888 B2
(45) Date of Patent: *Jan. 12, 2010

(54) TUNNEL DETECTING DEVICE FOR VEHICLE AND LIGHT CONTROL DEVICE FOR VEHICLE

(75) Inventor: Takeshi Tsukamoto, Okazaki (JP)

(73) Assignee: DENSO CORPORATION, Kariya (JP)

( * ) Notice: Subject to any disclaimer, the term of this patent is extended or adjusted under 35 U.S.C. 154(b) by 672 days.

This patent is subject to a terminal disclaimer.

(21) Appl. No.: 11/330,334

(22) Filed: Jan. 12, 2006

(65) Prior Publication Data

US 2006/0159309 A1 Jul. 20, 2006

(30) Foreign Application Priority Data

Jan. 14, 2005 (JP) ............................ 2005-007754

(51) Int. Cl.
*G06K 9/00* (2006.01)
*H04N 7/18* (2006.01)

(52) U.S. Cl. .................... 382/104; 382/274; 348/149

(58) Field of Classification Search ........ 382/103, 382/104, 105, 106, 107, 154, 162, 168, 181, 382/190–194, 203, 219, 232, 256, 274, 276, 382/305, 317; 348/149; 362/37; 701/301; 340/438

See application file for complete search history.

(56) References Cited

U.S. PATENT DOCUMENTS

| 6,313,457 | B1 | 11/2001 | Bauer et al. |
| 6,343,869 | B1 * | 2/2002 | Kobayashi .................. 362/37 |
| 6,359,274 | B1 | 3/2002 | Nixon et al. |
| 6,379,013 | B1 | 4/2002 | Bechtel et al. |
| 6,402,328 | B1 | 6/2002 | Bechtel et al. |

(Continued)

FOREIGN PATENT DOCUMENTS

EP  1 418 089  5/2004

(Continued)

OTHER PUBLICATIONS

Search Report dated Jan. 7, 2009 in corresponding French patent application No. 0600336 (and English translation).

(Continued)

*Primary Examiner*—Seyed Azarian
(74) *Attorney, Agent, or Firm*—Posz Law Group, PLC

(57) ABSTRACT

A vehicle tunnel detecting device includes an image pickup unit for picking up images of a forward area and an obliquely upper area with respect to a travel direction of a vehicle, an obliquely upper area brightness reduction detecting unit for judging whether an average brightness of the images of the obliquely upper area with respect to the travel direction picked up by the image pickup unit is lower than a predetermined value, a brightness difference detecting unit for calculating a difference in average brightness between the images of the forward and obliquely upper areas achieved by the image pickup unit when it is judged by the obliquely upper area brightness reduction detecting unit that the average brightness of the image of the obliquely upper area is lower than the predetermined value, and a tunnel identifying unit for identifying a tunnel when the difference in average brightness between the image of the forward area and the image of the obliquely upper area that is calculated by the brightness difference detecting unit is lower than a predetermined value.

5 Claims, 8 Drawing Sheets

U.S. PATENT DOCUMENTS

| | | |
|---|---|---|
| 6,469,291 B2 | 10/2002 | Bauer et al. |
| 6,504,142 B2 | 1/2003 | Nixon et al. |
| 6,677,986 B1 * | 1/2004 | Pochmuller ................ 348/149 |
| 6,679,608 B2 | 1/2004 | Bechtel et al. |
| 6,737,629 B2 | 5/2004 | Nixon et al. |
| 6,742,904 B2 | 6/2004 | Bechtel et al. |
| 6,755,542 B2 | 6/2004 | Bechtel et al. |
| 6,831,268 B2 | 12/2004 | Bechtel et al. |
| 6,859,546 B2 * | 2/2005 | Matsukawa et al. ........ 382/103 |
| 6,863,405 B2 | 3/2005 | Bechtel et al. |
| 6,943,342 B2 | 9/2005 | Bechtel et al. |
| 6,947,577 B2 * | 9/2005 | Stam et al. ................ 382/104 |
| 7,035,430 B2 * | 4/2006 | Ito et al. .................... 382/103 |
| 7,087,878 B2 | 8/2006 | Nixon et al. |
| 7,087,893 B2 | 8/2006 | Bechtel et al. |
| 7,205,329 B2 | 4/2007 | Chien et al. |
| 7,209,832 B2 * | 4/2007 | Yamamoto et al. .......... 701/301 |
| 7,239,231 B2 * | 7/2007 | Tsukamoto ................ 340/438 |
| 7,361,875 B2 | 4/2008 | Bechtel et al. |
| 7,378,633 B2 | 5/2008 | Nixon et al. |
| 7,543,946 B2 | 6/2009 | Ockerse et al. |
| 7,550,703 B2 | 6/2009 | Bechtel et al. |
| 2003/0160158 A1 | 8/2003 | Ishino et al. |
| 2004/0021947 A1 | 2/2004 | Schofield et al. |
| 2004/0114921 A1 | 6/2004 | Braun et al. |

FOREIGN PATENT DOCUMENTS

| | | |
|---|---|---|
| JP | A-7-125563 | 5/1995 |
| JP | A-11-139225 | 5/1999 |
| JP | A-2001-039210 | 2/2001 |
| JP | A-2004-182006 | 7/2004 |
| JP | A-2004-230963 | 8/2004 |

OTHER PUBLICATIONS

Office Action mailed Oct. 13, 2009 issued by the Japan Patent Office in corresponding patent application No. 2005-007754 (English translation enclosed).

* cited by examiner

TUNNEL DETECTING DEVICE FOR VEHICLE AND LIGHT CONTROL DEVICE FOR VEHICLE

CROSS REFERENCE TO RELATED APPLICATION

This application is based on and incorporates herein by reference Japanese Patent Application No. 2005-7754 filed on Jan. 14, 2005.

TECHNICAL FIELD

The technical field relates to a tunnel detecting device for a vehicle and a light control device for a vehicle.

BACKGROUND

JP-A-11-139225 discloses a tunnel detecting device for a vehicle that detects a tunnel by using an image pickup device. According to this tunnel detecting device, a white line is recognized, and an area in which the vehicle concerned will travel is searched to extract an area having a predetermined concentration. Furthermore, a noted area (low luminance area) indicating the entrance or exit of a tunnel is detected, and the height or area thereof is calculated, thereby detecting the tunnel.

An elevated bridge tends to be misidentified as a tunnel in a tunnel detecting technique for vehicles, and particularly in the case of use of a vehicle light control system, unnecessary instantaneous lighting occurs when a vehicle passes below an elevated bridge in the daytime. If unnecessary instantaneous lighting under the state that a vehicle passes below an elevated bridge is required to be prevented according to the technique of the above publication, it induces complexity of logic.

SUMMARY

In view of the foregoing situation, it is an object to provide a vehicle tunnel detecting device that can easily and surely detect a tunnel, particularly without misidentifying an over-crossing structure above a road such as an elevated bridge or the like as a tunnel, and a vehicle light control device.

The vehicle tunnel detecting device and vehicle light control device has been implemented by paying attention to detection of illuminance of the inside of the tunnel.

According to a first aspect, there is provided a vehicle tunnel detecting device comprising: an image pickup unit for picking up images of a forward area and an obliquely upper area with respect to the travel direction of a vehicle; an obliquely upper area brightness reduction detecting unit for judging whether the average brightness of the images of the obliquely upper area with respect to the travel direction by the image pickup unit is lower than a predetermined value; a brightness difference detecting unit for calculating the difference in average brightness between the images of the forward and obliquely upper areas achieved by the image pickup unit when it is judged by the obliquely upper area brightness reduction detecting unit that the average brightness of the image of the obliquely upper area is lower than the predetermined value; and a tunnel identifying unit for identifying a tunnel when the difference in average brightness between the image of the forward area and the image of the obliquely upper area that is calculated by the brightness difference detecting unit is lower than a predetermined value.

According to the first aspect, it is judged by the obliquely upper area brightness reduction detecting unit whether the average brightness of the image of the obliquely upper area with respect to the travel direction of the vehicle which is picked up by the image pickup unit is lower than the predetermined value. If the average brightness of the image of the obliquely upper area is lower than the predetermined value, it is judged that the structure may be a tunnel. Then, the difference in average brightness between the image of the forward area and the image of the obliquely upper area which are achieved by the image pickup unit is calculated by the brightness difference detecting unit. Here, the received images are compared between a tunnel and an elevated bridge or the like. When illumination in the tunnel is displayed in the image of the obliquely upper area, the difference in average brightness between the image of the forward area and the image of the obliquely upper area is reduced. Accordingly, if it is judged by the brightness difference detecting unit that the difference in average brightness between the image of the forward area and the image of the obliquely upper area is lower than the predetermined value, the tunnel identifying unit identifies that the structure is a tunnel. As described above, the tunnel can be discriminated from the elevated bridge, etc. As a result, the tunnel can be easily and surely detected without misidentifying as a tunnel an over-crossing structure above a road such as an elevated bridge.

According to a second aspect, there is provided a vehicle tunnel detecting device comprising: an image pickup unit for picking up an image of an obliquely upper area with respect to a travel direction of a vehicle; an obliquely upper area brightness reduction detecting unit for judging whether the average brightness of the image of the obliquely upper area with respect to the travel direction which is achieved by the image pickup unit is lower than a predetermined value; a high brightness area extracting unit for binarizing the image of the obliquely upper area with respect to the travel direction which is achieved by the image pickup unit when it is judged by the obliquely upper area brightness reduction detecting unit that the brightness of the image of the obliquely upper area is lower than the predetermined value, and extracting a high brightness area whose brightness is higher than predetermined brightness; and a tunnel identifying unit for identifying a tunnel when it is judged by the high brightness area extracting unit that at least one of the size and number of high brightness areas having predetermined brightness or more satisfies a predetermined condition.

According to the second aspect, it is judged by the obliquely upper area brightness reduction detecting unit whether the average brightness of the image of the obliquely upper area with respect to the travel direction which is achieved by the image pickup unit is lower than the predetermined value, and when the average brightness of the image of the obliquely upper area is lower than the predetermined value, it is judged that the structure may be a tunnel. Then, the high brightness area extracting unit can binarize the image of the obliquely upper area with respect to the travel direction which is picked up by the image pickup unit, and extract the high brightness area having predetermined brightness or more. Here, the high brightness area having the predetermined brightness or more corresponds to the illumination in the tunnel, and thus the illumination in the tunnel can be identified if at least one of the size of a high brightness area and the number of high brightness areas satisfies a predetermined condition. Accordingly, when it is judged that at least one of the size and the number of the high brightness area(s) having the predetermined brightness or more extracted by the high brightness area extracting unit satisfies the predetermined condition, the tunnel identifying unit identifies the tunnel. As described above, the tunnel can be discriminated from the elevated bridge, etc. As result, the tunnel can be easily and surely detected particularly without misidentifying as a tunnel an over-crossing structure above a road, such as an elevated bridge or the like.

According to a third aspect, there is provided a vehicle tunnel detecting device comprising: an image pickup unit for picking up images of a forward area and an obliquely upper area with respect to the travel direction of a vehicle; an obliquely upper area brightness reduction detecting unit for judging whether the average brightness of the images of the obliquely upper area with respect to the travel direction by the image pickup unit is lower than a predetermined value; a high brightness area extracting unit for binarizing the image of the obliquely upper area with respect to the travel direction which is picked up by the image pickup unit when it is judged by the obliquely upper area brightness reduction detecting unit that average brightness of the image of the obliquely upper area is lower than a predetermined value, and extracting a high brightness area whose brightness is higher than predetermined brightness; a brightness difference detecting unit for calculating the difference in average brightness between the image of the forward area and the image of the obliquely upper area which are picked up by the image pickup unit when it is judged that at least one of the size and number of high brightness areas having predetermined brightness or more extracted by the high brightness area extracting unit satisfies a predetermined condition; and a tunnel identifying unit for identifying a tunnel when the difference in average brightness between the image of the forward area and the image of the obliquely upper area that is calculated by the brightness difference detecting unit is lower than a predetermined value.

According to the third aspect, it is judged by the obliquely upper area brightness reduction detecting unit whether the average brightness of the image of the obliquely upper area with respect to the travel direction which is picked up by the image pickup unit is lower than the predetermined value, and if the average brightness of the image of the obliquely upper area is lower than the predetermined value, the probability that the structure is a tunnel is judged. Then, the image of the obliquely upper area with respect to the travel direction which is picked up by the image pickup unit is binarized by the high brightness area extracting unit to extract a high brightness area having predetermined brightness or more. Here, the high brightness area having the predetermined brightness or more corresponds to the illumination in the tunnel, and when at least one of the size and number of high brightness area(s) satisfies the predetermined condition, it is judged that the illumination is substantially the illumination in the tunnel.

Furthermore, when at least one of the size and number of high brightness areas having the predetermined brightness or more extracted by the high brightness area extracting unit satisfies the predetermined condition, the difference in average brightness between the image of the forward area and the image of the obliquely upper area which are picked up by the image pickup unit is calculated by the brightness difference detecting unit. Here, in the comparison between the received image in a tunnel and the received image under an elevated bridge or the like, when the illumination in the tunnel is displayed in the image of the obliquely upper area, the difference in average brightness between the image of the forward area and the image of the obliquely upper area is reduced. Accordingly, when the difference in average brightness between the image of the forward area and the image of the obliquely upper area which is calculated by the brightness difference detecting unit is lower than the predetermined value, the tunnel identifying unit identifies the structure as a tunnel. As described above, the tunnel can be discriminated from the elevated bridge or the like. As a result, the tunnel can be easily and surely detected particularly without misidentifying as a tunnel an over-crossing structure above a road, such as an elevated bridge or the like.

According to a fourth aspect, there is provided a vehicle light control device for turning on a vehicle lamp when the tunnel identifying unit of the vehicle tunnel detecting device according to any one of the first to third aspects of the invention identifies a tunnel.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE PREFERRED EMBODIMENTS

First Embodiment

A first embodiment will be described with reference to the accompanying drawings.

Figure 1:
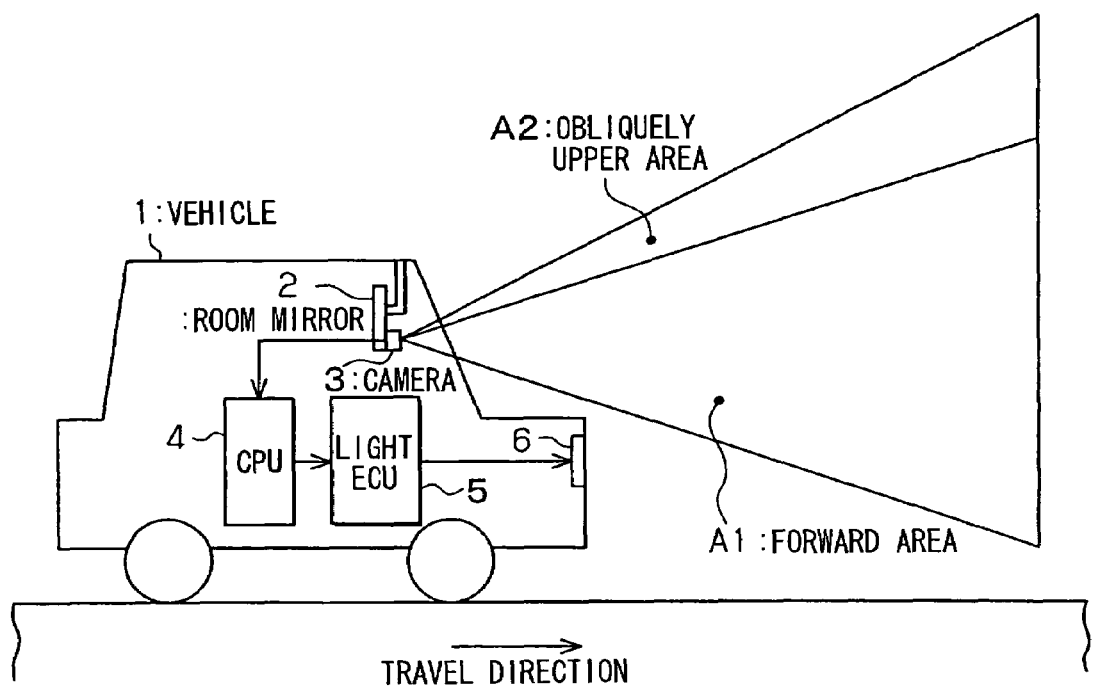
FIG. 1 is a diagram showing the construction of a vehicle light control device (vehicle tunnel detecting device) according to a first embodiment.

FIG. 1 is a diagram showing a tunnel detecting device for a vehicle according to an embodiment and a vehicle light control device using the vehicle tunnel detecting device.

In FIG. 1, a camera 3 is provided as an image pickup unit to the back surface of a room mirror 2 of a vehicle 1. The images of the forward area and the obliquely upper area with respect to the travel direction of the vehicle 1 can be picked up by the camera 3. CCD or C-MOS may be used as an image pickup element. The camera 3 is connected to a CPU 4, and the images picked up by the camera 3 are transmitted to CPU 4. The CPU 4 detects a tunnel on the basis of the images concerned.

In this embodiment, the image of the forward area and the image of the obliquely upper area with respect to the travel direction are picked up by one camera. However, two cameras may be used. In this case, the image of the forward area with respect to the travel direction may be picked up by a first camera while the image of the obliquely upper area with respect to the travel direction is picked up by a second camera.

An electronic control unit (ECU) 5 for controlling light is connected to CPU 4. A vehicle lamp 6 such as a headlamp or the like may be turned on/turned off by the electronic control unit 5. CPU 4 turns on the vehicle lamp 6 through the electronic control unit 5 when the vehicle enters a tunnel in the daytime, and also turns off the vehicle lamp 6 through the electronic control unit 5 when the vehicle exits from the tunnel.

In this embodiment, CPU 4 constitutes an obliquely upper area brightness reduction detecting unit, a brightness difference detecting unit and a tunnel identifying unit.

Next, the operation of the vehicle light control device (vehicle tunnel detecting device) of this embodiment will be described.

Figure 2:
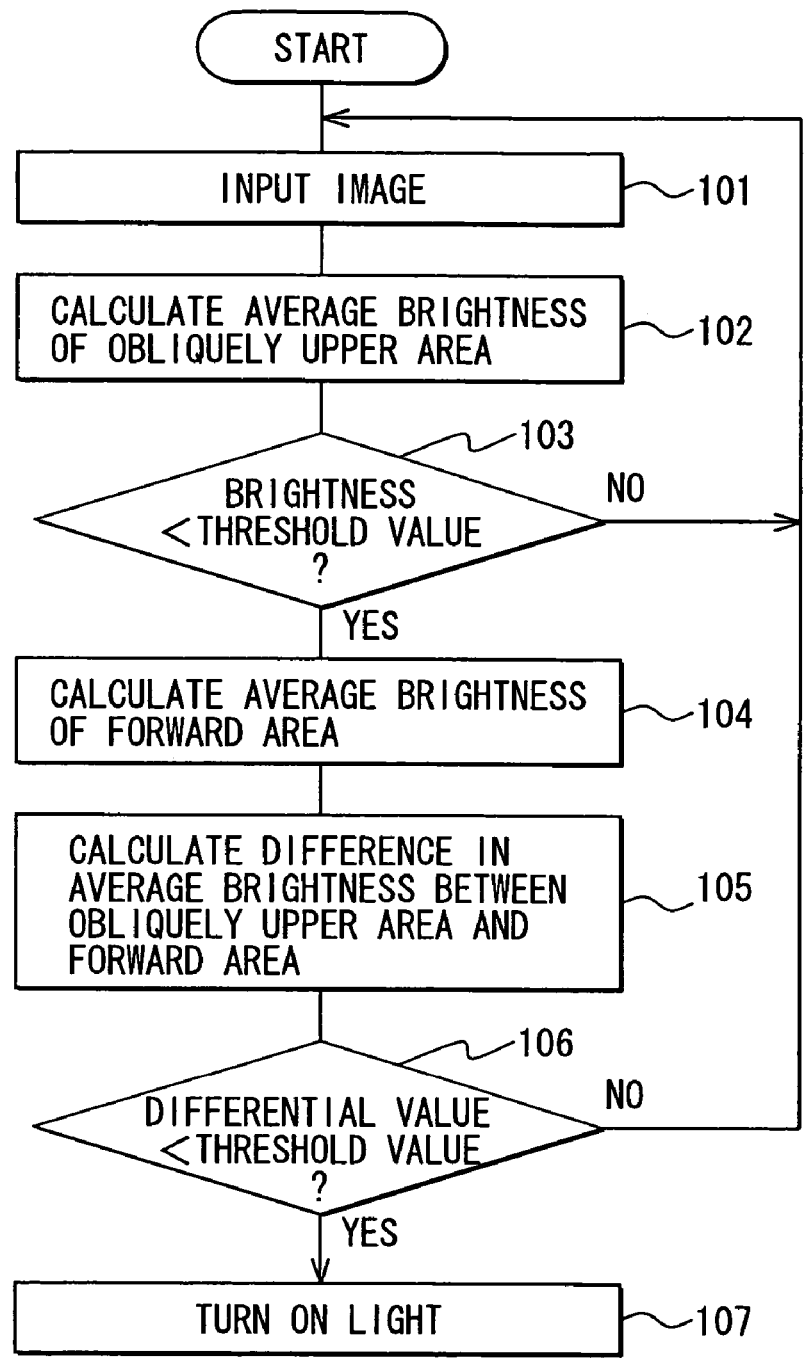
FIG. 2 is a flowchart showing the operation of the vehicle light control device (vehicle tunnel detecting device) according to the first embodiment.
Figure 3:
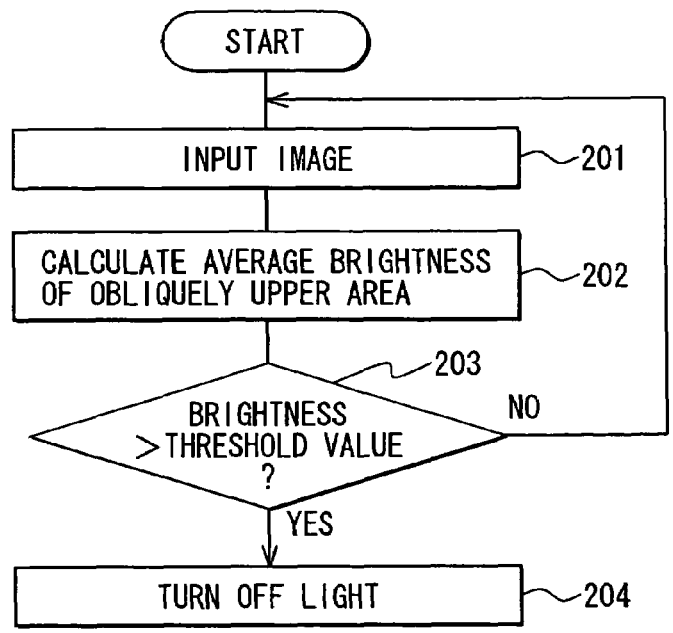
FIG. 3 is a flowchart showing the operation of the vehicle light control device (vehicle tunnel detecting device) according to the embodiment.
Figure 4:
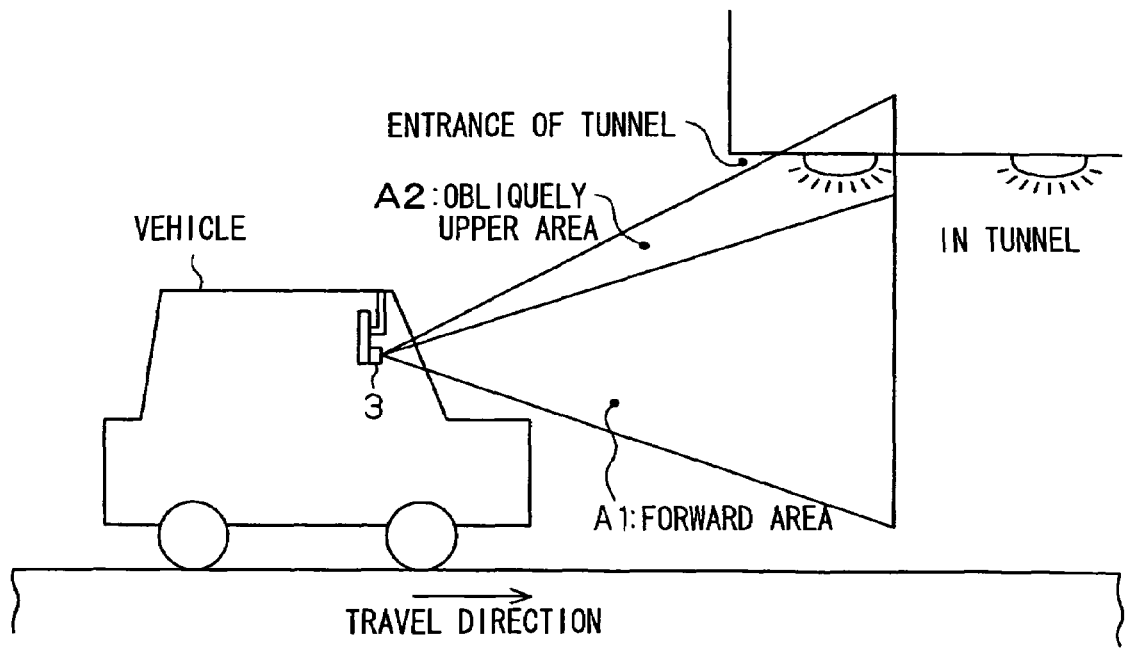
FIG. 4 is a diagram showing a vehicle running in the neighborhood of the entrance of a tunnel.
Figure 5:
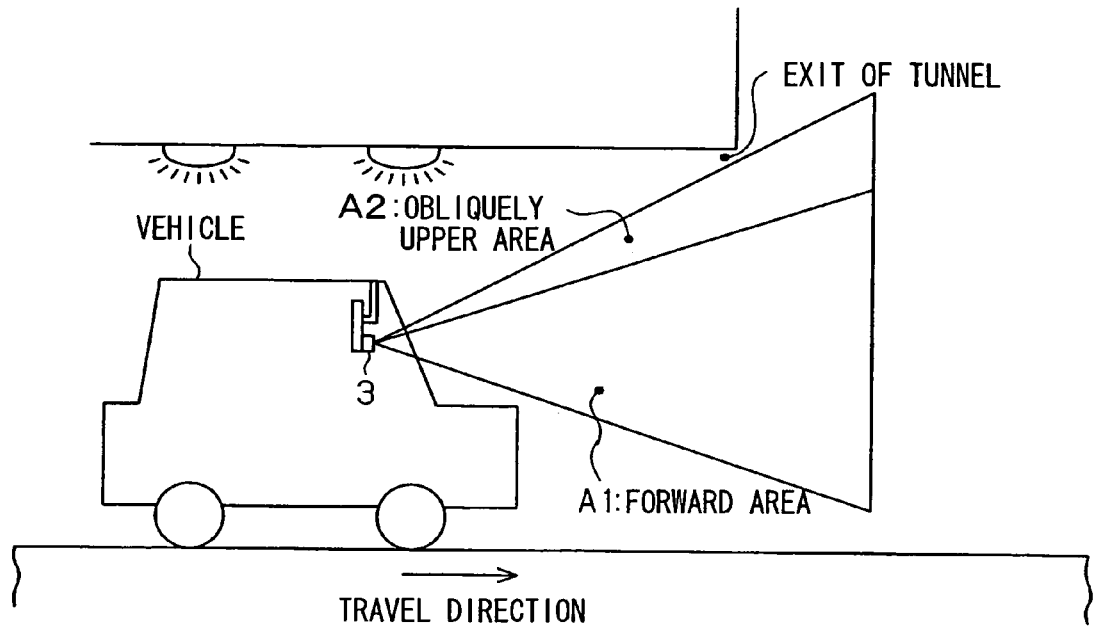
FIG. 5 is a diagram showing the vehicle running in the neighborhood of the exit of the tunnel.

FIGS. 2 and 3 are flowcharts showing the processing content executed by the CPU 4. FIG. 4 shows a vehicle running in the neighborhood of the entrance of a tunnel, FIG. 5 shows the vehicle operating in the neighborhood of the exit of the tunnel, and FIG. 6 shows the vehicle operating in front of an elevated bridge.

Figure 7:
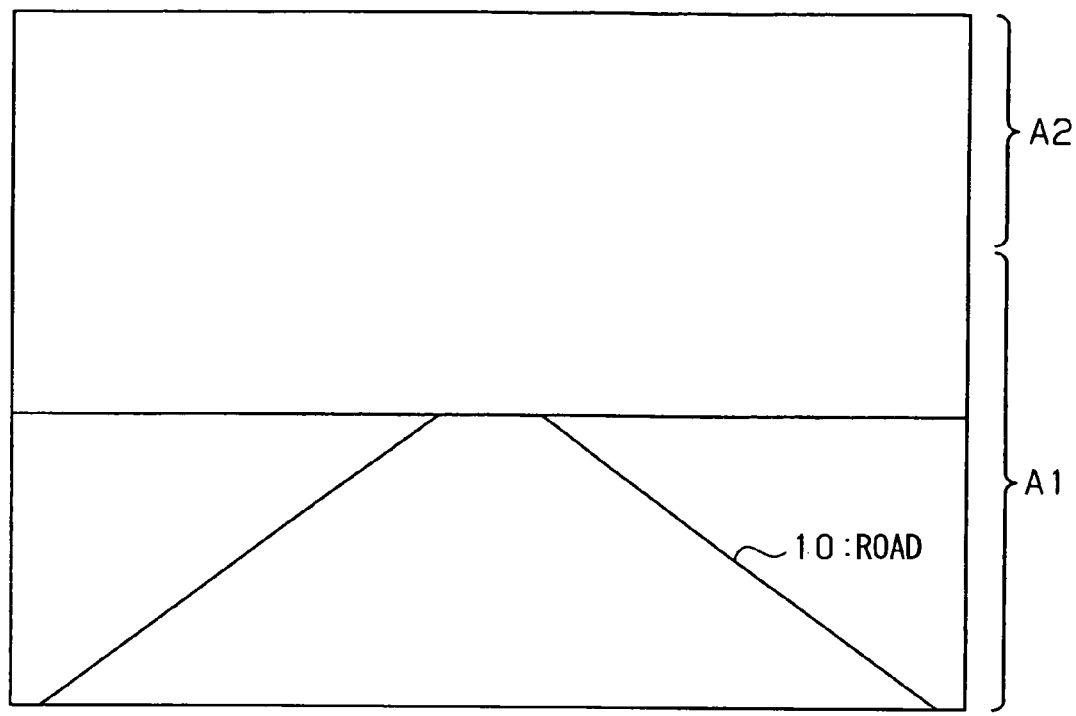
FIG. 7 is a diagram showing a received image.

In FIG. 2, CPU 4 inputs an image picked up by the camera 3 in step 101. FIG. 7 shows an image picked up by the camera when the vehicle is traveling at a place where neither tunnel nor elevated bridge exists, and reference numeral 10 represents a road and also shows a received image (area) of a forward area A1 of FIG. 1 and a received image (area) of an obliquely upper area A2 of FIG. 1.

After CPU 4 stores image data in a memory, CPU 4 inputs image data from the memory in step 102 of FIG. 2 to calculate the average brightness of the image of the obliquely upper area. Furthermore, in step 103, CPU 4 judges whether the average brightness of the image of the obliquely upper area is lower than a predetermined value. If it is equal to a predetermined value or more (bright), it is judged that the vehicle runs in the daytime at a place where neither tunnel nor elevated bridge exists, and thus the processing returns to step 101.

Figure 6:
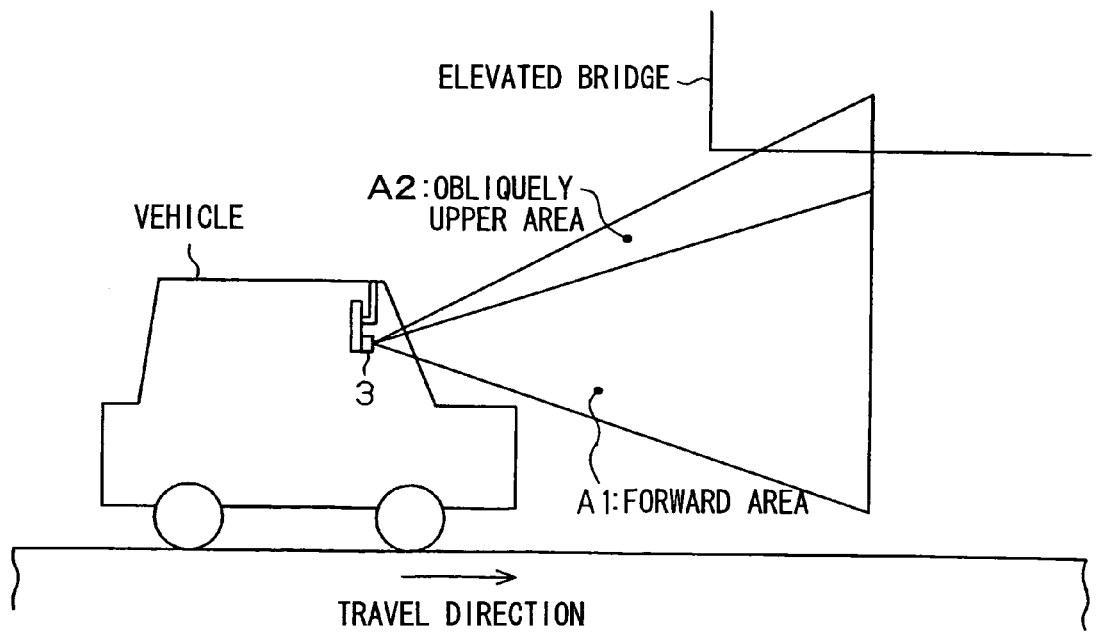
FIG. 6 is a diagram showing the vehicle running in front of an elevated bridge.

On the other hand, if the average brightness of the image of the obliquely upper area is lower than a predetermined value (becomes dark), CPU 4 judges that the vehicle may be approaching a tunnel or an elevated bridge as shown in FIG. 4 or 6 (a structure in front of the vehicle is judged as a tunnel), the processing goes to step 104 to calculate the average brightness of the image of the forward area in step 104. Furthermore, CPU 4 calculates the difference (differential value) in average brightness between the image of the obliquely upper area and the image of the forward area in step 105. In step 106, CPU 4 judges whether the differential value is lower than a predetermined value.

Figure 8:
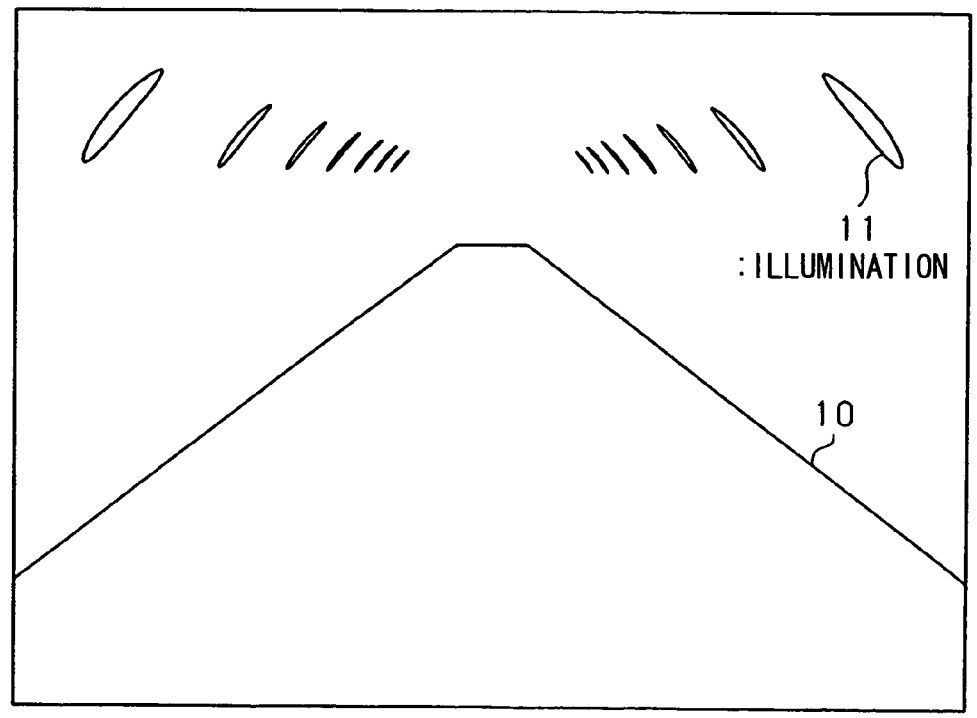
FIG. 8 is a diagram showing a received image.
Figure 9:
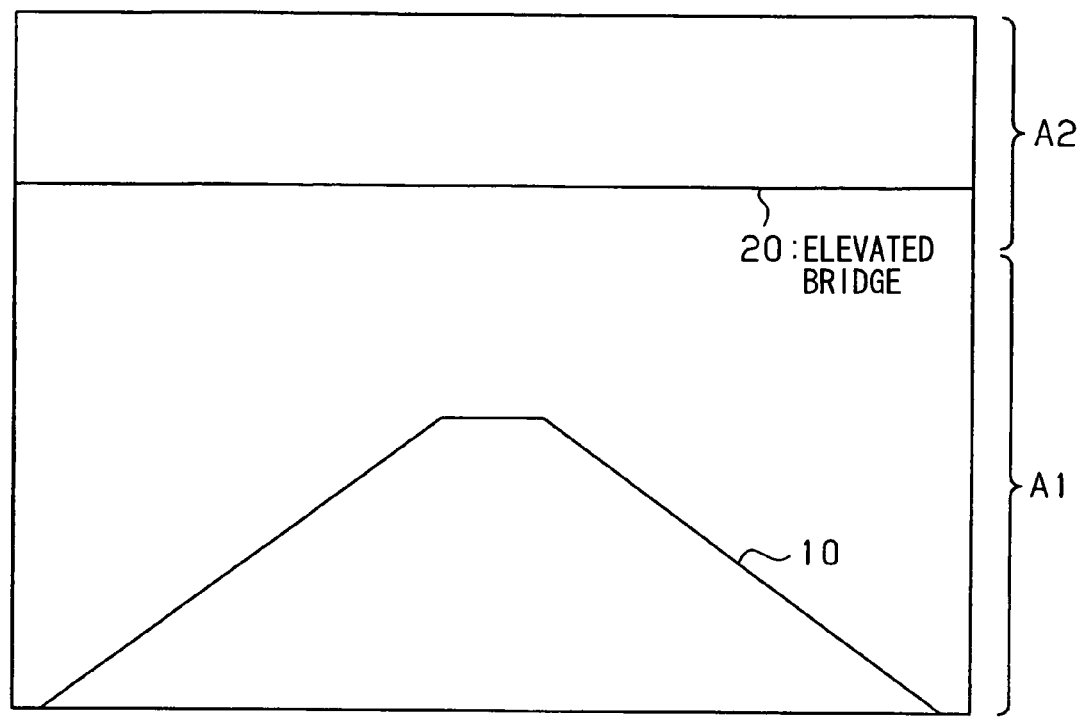
FIG. 9 is a diagram showing a received image.

FIG. 8 shows an image picked up by the camera 3 when the vehicle runs at the entrance of the tunnel (reference numeral 11 represents the illumination in the tunnel). FIG. 9 shows an image picked up by the camera 3 when the vehicle runs in front of the elevated bridge (reference numeral 20 represents the elevated bridge).

If the differential value in average brightness between the image of the obliquely upper area and the image of the forward area is smaller than the predetermined value in step 106 of FIG. 2, CPU 4 judges that the structure concerned is a tunnel (the entrance of the tunnel) as shown in FIG. 4, and turns on the vehicle lamp 6 in step 107. On the other hand, if the differential value in average brightness between the image of the oblique upper area and the image of the forward area is equal to or larger than the predetermined value in step 106, CPU 4 judges that the structure is an elevated bridge as shown in FIG. 6, and thus returns to the step 101. Therefore, the vehicle lamp is not turned on.

As described above, in consideration of the detection of the illumination in the tunnel, the image of the illumination is picked up by the camera 3, and then subjected to image processing. In this case, images picked up in the tunnel and under the elevated bridge by the camera 3 are compared with each other. When the illumination in the tunnel is displayed in the image of the obliquely upper area, the difference in average brightness between the image of the forward area and the image of the obliquely upper area is reduced. Accordingly, the tunnel can be clearly discriminated from the elevated bridge. As a result, the tunnel can be easily and surely detected particularly without an over-crossing structure above a road such as an elevated bridge or the like being misidentified as a tunnel. Accordingly, according to the vehicle light control device, the vehicle lamp can be prevented from being erroneously turned on under an elevated bridge. Furthermore, since the illumination in the tunnel is detected, it is unnecessary to calculate a travel route for recognition of a white line, and thus the logic is simplified. Therefore, this device can be implemented by an inexpensive microcomputer.

Furthermore, the camera receives (i.e. scans or picks up) the image of the obliquely upper area, and thus the tunnel (the illumination in the tunnel) can be detected and the vehicle lamp is turned on just before the vehicle enters the tunnel. Accordingly, as compared with a case where the lamp is turned on after the vehicle enters the tunnel, driver's uncomfortable feeling can be suppressed, and the safety can be enhanced.

As compared with the approach disclosed in JP-A-11-139225, even when an obstacle (such as a dark colored vehicle) exists in front of the vehicle concerned and approaches the vehicle concerned, the obstacle can be prevented from being misidentified as a tunnel. Furthermore, the tunnel detection can be performed irrespective of the surrounding environment such as backlight or the like (the vehicle lamp can be prevented from being erroneously turned on even under such a situation that a mountain becomes a low illuminance area due to backlight or the like and thus it is difficult to identify the entrance of a tunnel).

Next, the processing when the vehicle travels (or is operated) in a tunnel will be described with reference to the flowchart of FIG. 3.

First, in step 201, CPU 4 first inputs an image received by the camera 3. After the CPU 4 stores the image data into the memory, the CPU 4 calculates the average brightness of the obliquely upper area in step 202. Then, CPU 4 judges whether the average brightness of the obliquely upper area is larger than a predetermined value (that is, bright) in step 203. If the average brightness of the obliquely upper area is equal to or lower than the predetermined value (dark), the CPU 4 judges that the vehicle is traveling at a place farther from the exit of the tunnel, and returns the processing to step 201, whereby the turn-on state of the vehicle lamp is maintained. If the average brightness of the obliquely upper area is larger than the predetermined value (bright) in step 203, the CPU 4 judges that the structure is a tunnel and thus turns off the vehicle lamp in step 204 as shown in FIG. 5.

As described above, when the average brightness in the image of the obliquely upper area with respect to the travel direction in the tunnel which is picked up by the camera 3 is larger than the predetermined value, CPU 4 identifies the exit of the tunnel and turns out the vehicle lamp.

Second Embodiment

Next, a second embodiment will be described by focusing on the difference from the first embodiment.

Figure 10:
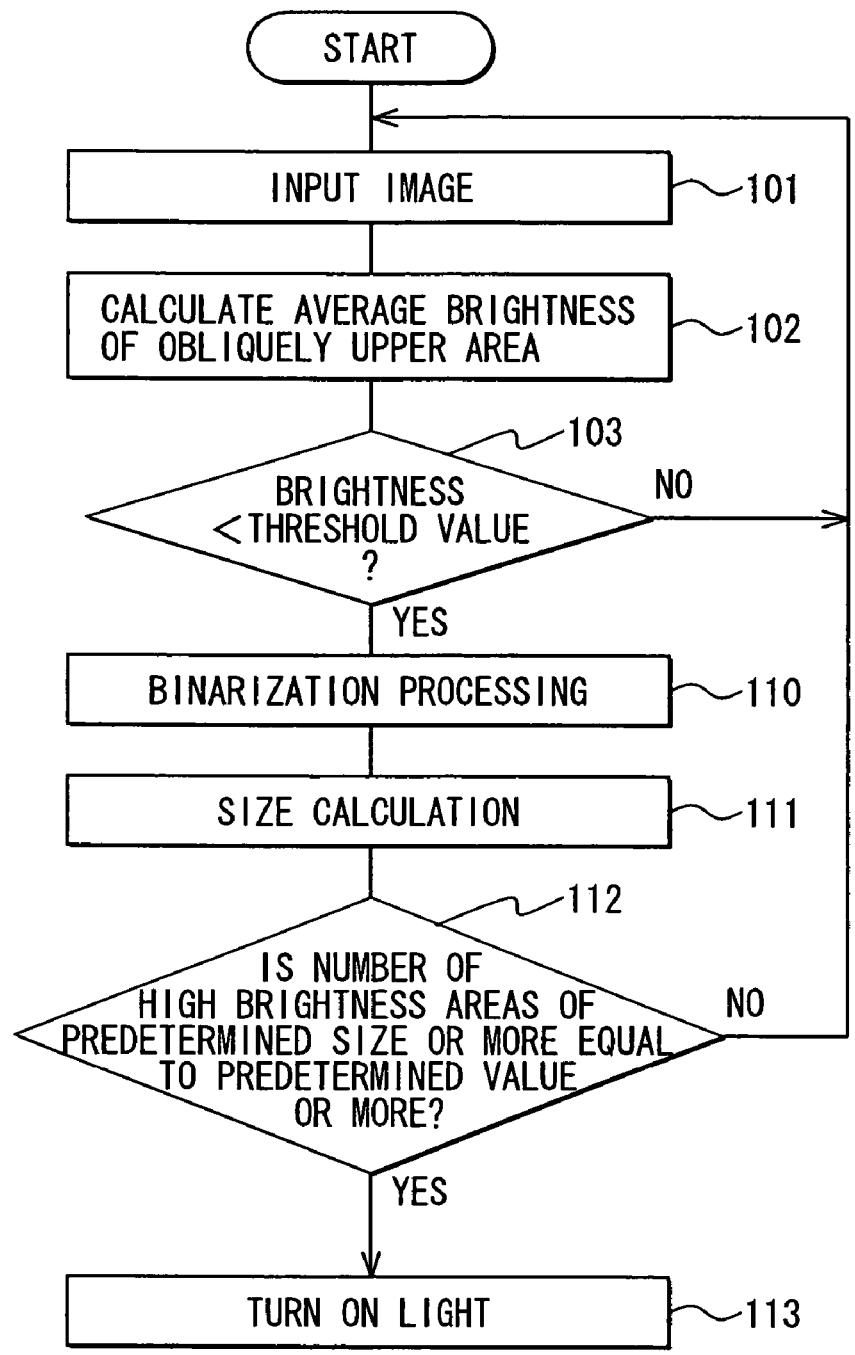
FIG. 10 is a flowchart showing the operation of a vehicle light control device (vehicle tunnel detecting device) according to a second embodiment.

FIG. 10 is a flowchart of the second embodiment which substitutes FIG. 2.

In FIG. 10, CPU 4 inputs an image of the obliquely upper area which is picked up by the camera 3 in step 101. After storing the image data into the memory, CPU 4 inputs the image data from the memory, and calculates the average brightness in the image of the obliquely upper area in step 102. Furthermore, in step 103, CPU 4 judges whether the average brightness of the image of the obliquely upper area is smaller than a predetermined value. If it is above the predetermined value (bright), CPU 4 judges that the vehicle runs in the daytime at a place where neither tunnel, nor elevated bridge exists, and thus returns to step 101.

Figure 11:
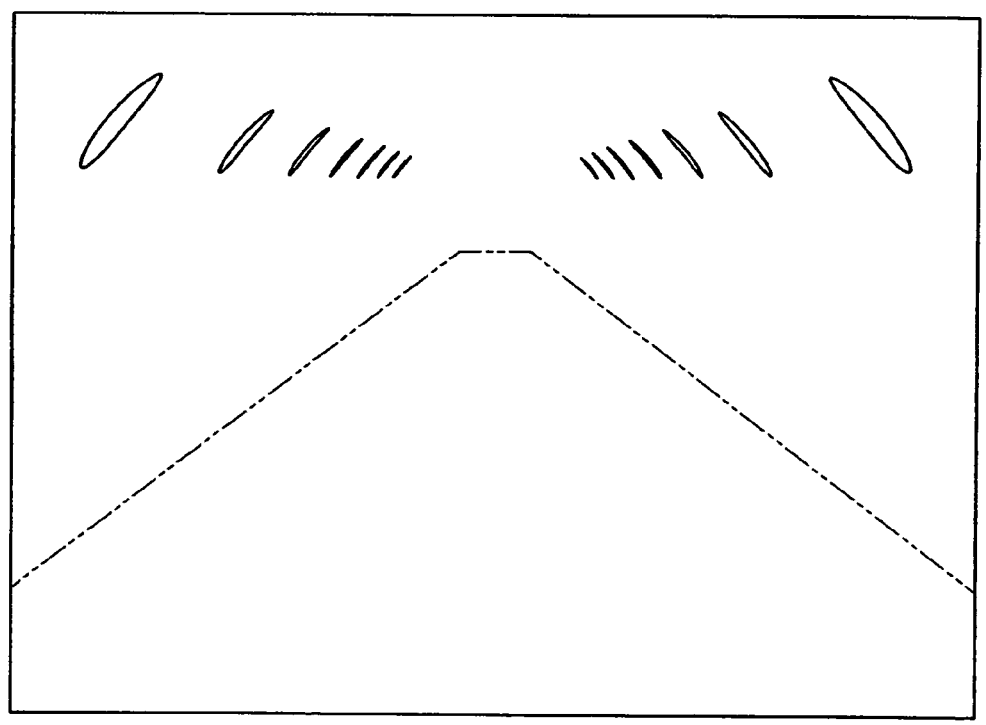
FIG. 11 is a diagram showing an image after binarization processing.

On the other hand, when the average brightness of the image of the obliquely upper area is lower than a predetermined value (dark), CPU 4 judges that the vehicle may approach a tunnel or an elevated bridge as shown in FIG. 4 or 6 (it is judged that the structure may be a tunnel), and goes to step 110. In step 110, the image of the obliquely upper area is subjected to binarization processing on the basis of a predetermined density (predetermined threshold value) to extract high brightness areas having predetermined brightness or more. Accordingly, the illumination in the tunnel can be detected. FIG. 11 shows an image achieved by binarizing the image data of FIG. 8.

CPU 4 calculates the size of each high brightness area having the predetermined brightness or more in step 111. If the number of high brightness areas of predetermined size or more is equal to a predetermined value or more in step 112, CPU 4 identifies the tunnel (the entrance of the tunnel), and thus turns on the vehicle lamp 6 in step 113. That is, the high brightness area having the predetermined brightness or more corresponds to the illumination in the tunnel, and under the condition that the size and number of the high brightness areas satisfy the predetermined condition, CPU 4 identifies the illumination in the tunnel. For example, when the number of the high brightness areas having the predetermined size or more is equal to four or more in FIG. 11, CPU 4 identifies the illumination in the tunnel.

On the other hand, if the number of the high brightness areas having the predetermined size or more is less than the predetermined value in step 112, CPU 4 judges that rain drops adhere to the lower surface of an elevated bridge and light is reflected or the like, that is, CPU 4 judges that the structure is an elevated bridge as shown in FIG. 6. Therefore, CPU 4 returns to step 101, and does not turn on the vehicle lamp.

Here, in steps 111, 112, with respect to the extracted high brightness areas, if the number of high brightness areas having a predetermined size or more is equal to a predetermined value or more, the tunnel (illumination) is identified. However, for example if the size of a high brightness area is equal to a predetermined value or more, the tunnel (illumination) may be identified, or if the number of high brightness areas is equal to a predetermined number or more, the tunnel (illumination) may be identified. In short the image of the obliquely upper area is subjected to binarization processing to extract high brightness area having predetermined brightness or more, and if at least one of the size and number of the high brightness area(s) having the predetermined brightness or more satisfies a predetermined condition, the tunnel (entrance of the tunnel) is identified.

As described above, if at least one of the size and number of the high brightness area(s) having the predetermined brightness or more satisfies the predetermined condition, the tunnel (the entrance of the tunnel) is identified, and thus the tunnel and the elevated bridge can be identified discriminatively identified. As a result, the tunnel can be easily and surely detected particularly without misidentifying as a tunnel the over-crossing structure above the road such as an elevated bridge. Furthermore, the image of the obliquely upper area is picked up by the camera. Therefore, the tunnel can be detected and the vehicle lamp can be turned on just before the vehicle enters the tunnel.

In this embodiment, CPU 4 constitutes the obliquely upper area brightness reduction detecting unit, the high brightness area extracting unit and the tunnel identifying unit. The judgment as to the exit of the tunnel is the same as shown in FIG. 3, and thus the description thereof is omitted.

Furthermore, in this embodiment, at least the image of the obliquely upper area with respect to the travel direction of the vehicle can be picked up by the camera 3.

Third Embodiment

Next, a third embodiment will be described by focusing on the difference from the first and second embodiments.

Figure 12:
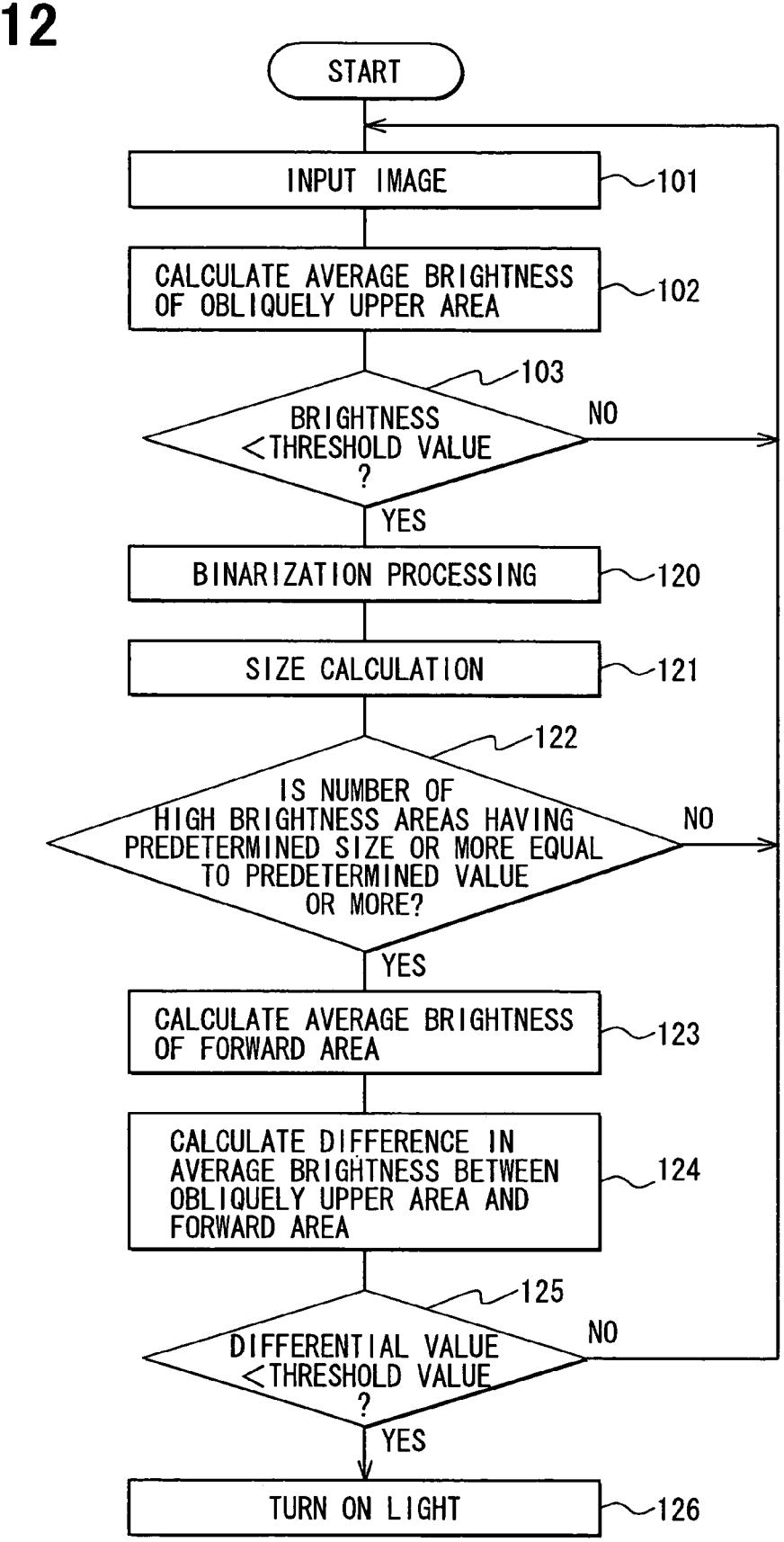
FIG. 12 is a flowchart showing the operation of a vehicle light control device (vehicle tunnel detecting device) of a third embodiment.

FIG. 12 is a flowchart showing the third embodiment which substitutes FIGS. 2 and 10.

In FIG. 12, in step 101, CPU 4 inputs an image picked up by the camera 3. After storing the image data into a memory, CPU 4 inputs the image data from the memory in step 102, and calculates the average brightness in the image of the obliquely upper area. Furthermore, the CPU 4 judges in step 103 whether the average brightness of the image of the obliquely upper area is smaller than a predetermined value. If the average brightness is equal to the predetermined value or more (bright), CPU 4 judges that the vehicle is being operated in the daytime at a place where neither tunnel nor elevated bridge exists, and returns to step 101.

On the other hand, when the average brightness of the image of the obliquely upper area is smaller than a predetermined value (dark), CPU 4 judges that the vehicle may be approaching a tunnel or an elevated bridge (a tunnel may exist), and proceeds to step 120. In step 120, the image of the obliquely upper area is subjected to a binarization processing using a predetermined density (predetermined threshold) to extract high brightness areas having predetermined brightness or more, whereby the illumination in the tunnel can be detected (see FIG. 11). Furthermore, CPU 4 calculates the size of each high brightness area having the predetermined brightness or more in step 121, and if the number of high brightness areas having a predetermined size or more is equal to or higher than a predetermined value in step 122, CPU 4 judges that it is the illumination in the tunnel with high probability and thus proceeds to step 123. Specifically, for example, if the number of high brightness areas having the predetermined size or more is equal to four or more in FIG. 11, CPU 4 judges that the probability of the illumination in the tunnel is high.

Here, in steps 121, 122, with respect to the extracted high brightness area having the predetermined brightness or more, if the number of high brightness areas each having a predetermined size or more is equal to a predetermined value or more, it may be judged that the probability of the illumination in the tunnel is high. However it may be judged that the probability of the illumination in the tunnel is high if the size of the high brightness area is not less than the predetermined value, or it may be judged that the probability of the illumination in the tunnel is high if the number of high brightness areas is equal to a predetermined value or more. In short, the image of the obliquely upper area is subjected to binary processing to extract high brightness areas having predetermined brightness or more, and if at least one of the size and number of the high brightness area having the predetermined brightness or more satisfies a predetermined condition, it may be judged that the area concerned is the illumination in the tunnel with high probability.

CPU 4 calculates the average brightness of the image of the forward area with respect to the travel direction in step 123. Furthermore, CPU 4 calculates the difference in average brightness between the image of the obliquely upper area and the image of the forward area in step 124. CPU 4 judges in step 125 whether the differential value is smaller than a predetermined value. If the differential value in average brightness between the image of the obliquely upper area and the image of the forward area is smaller than a predetermined value, CPU 4 identifies the tunnel (the entrance of the tunnel), and turns on the vehicle lamp 6 in step 126 (see FIG. 4). On the other hand, if the differential value in average brightness between the obliquely upper area and the forward area is larger than a predetermined value in step 125, CPU 4 judges that the area concerned is an elevated bridge and thus returns to step 101 not to turn on the vehicle lamp (see FIG. 6).

As described above, the image of the obliquely upper area with respect to the travel direction which is picked up by the camera 3 is subjected to the binarization processing, and high brightness areas each having predetermined brightness or more are extracted. At this time, the high brightness area having the predetermined brightness or more corresponds to the illumination in the tunnel, and if at least one of the size and number of the high brightness areas satisfied a predetermined condition, it can be substantially identified as the illumination in the tunnel. If at least one of the size and number of the high brightness area having the predetermined brightness or more satisfies a predetermined condition, the difference in average brightness between the image of the forward area and the image of the obliquely upper area is calculated. Here, the received imaged in a tunnel and under an elevated bridge are compared with each other. When the illumination in the tunnel is displayed in the image of the obliquely upper area, the difference in average brightness between the image of the forward area and the image of the obliquely upper area is reduced. Accordingly, if the difference in average brightness between the image of the forward area and the image of the obliquely upper area is smaller than a predetermined value, it can be judged that the area is a tunnel. As described above, as compared with the first and second embodiments, the tunnel can be discriminated from the elevated bridge more clearly. As a result, the tunnel can be easily and surely detected particularly without misidentifying as a tunnel such any overcrossing structure above a road as an elevated bridge or the like. Furthermore, since the camera 3 picks up the image of the obliquely upper area, and thus the tunnel can be detected and the vehicle lamp can be turned on just before the vehicle enters the tunnel.

In this embodiment, CPU 4 constitutes the obliquely upper area brightness reduction detecting unit, the high brightness area extracting unit, the brightness difference detecting unit and the tunnel identifying unit. The judgment as to the exit of the tunnel is the same as shown in FIG. 3, and thus the description thereof is omitted.

In the first to third embodiments, features of the invention are implemented in the vehicle tunnel detecting device and the vehicle light control device using the vehicle tunnel detecting device (the system of detecting the tunnel and turning on the vehicle lamp). However, these features may also be implemented in other systems such as a system of switching an outside air take-in mode to an inside air circulating mode in an air conditioner when a tunnel is detected.

What is claimed is:

1. A vehicle tunnel detecting device comprising:
    an image pickup unit for picking up an image of an obliquely upper area with respect to a travel direction of a vehicle;
    an obliquely upper area brightness reduction detecting unit for judging whether an average brightness of the image of the obliquely upper area with respect to the travel direction which is achieved by the image pickup unit is lower than a predetermined value;
    a high brightness area extracting unit for binarizing the image of the obliquely upper area with respect to the travel direction which is achieved by the image pickup unit when it is judged by the obliquely upper area brightness reduction detecting unit that the average brightness of the image of the obliquely upper area is lower than the predetermined value, and extracting a high brightness area having a brightness that is higher than a predetermined brightness; and
    a tunnel identifying unit for identifying a tunnel when it is judged by the high brightness area extracting unit that at least one of a size and number of high brightness areas having a predetermined brightness or more satisfies a predetermined condition.

2. A vehicle tunnel detecting device comprising:
    an image pickup unit for picking up images of a forward area and an obliquely upper area with respect to a travel direction of a vehicle;
    an obliquely upper area brightness reduction detecting unit for judging whether an average brightness of the images of the obliquely upper area achieved by the image pickup with respect to the travel direction unit is lower than a predetermined value;
    a high brightness area extracting unit for binarizing the image of the obliquely upper area with respect to the travel direction when it is judged by the obliquely upper area brightness reduction detecting unit that the average brightness of the image of the obliquely upper area is lower than a predetermined value, and extracting a high brightness area having a brightness higher than predetermined brightness;
    a brightness difference detecting unit for calculating a difference in average brightness between the image of the forward area and the image of the obliquely upper area which are picked up the image pickup unit when it is judged that at least one of a size and a number of high brightness areas having predetermined brightness or more extracted by the high brightness area extracting unit satisfies a predetermined condition; and
    a tunnel identifying unit for identifying a tunnel when the difference in the average brightness between the image of the forward area and the image of the obliquely upper area that is calculated by the brightness difference detecting unit is lower than a predetermined value.

3. A vehicle light control device using a vehicle tunnel detecting device comprising:
    an image pickup unit for picking up an image of an obliquely upper area with respect to a travel direction of a vehicle;

an obliquely upper area brightness reduction detecting unit for judging whether the average brightness of the image of the obliquely upper area with respect to the travel direction which is achieved by the image pickup unit is lower than a predetermined value;

a high brightness area extracting unit for binarizing the image of the obliquely upper area with respect to the travel direction which is achieved by the image pickup unit when it is judged by the obliquely upper area brightness reduction detecting unit that the brightness of the image of the obliquely upper area is lower than the predetermined value, and extracting a high brightness area having a brightness that is higher than predetermined brightness; and a tunnel identifying unit for identifying a tunnel when it is judged by the high brightness area extracting unit that at least one of a size and number of high brightness areas satisfies a predetermined condition, wherein the vehicle light control device turns on a vehicle lamp when the tunnel identifying unit identifies a tunnel.

4. A vehicle light control device using a vehicle tunnel detecting device comprising:

an image pickup unit for picking up images of a forward area and an obliquely upper area with respect to a travel direction of a vehicle;

an obliquely upper area brightness reduction detecting unit for judging whether an average brightness of the images of the obliquely upper area with respect to the travel direction by the image pickup unit is lower than a predetermined value;

a high brightness area extracting unit for binarizing the image of the obliquely upper area with respect to the travel direction which is picked up by the image pickup unit when it is judged by the obliquely upper area brightness reduction detecting unit that average brightness of the image of the obliquely upper area is lower than a predetermined value, and extracting a high brightness area whose brightness is higher than predetermined brightness;

a brightness difference detecting unit for calculating a difference in an average brightness between the image of the forward area and the image of the obliquely upper area which are picked up the image pickup unit when it is judged that at least one of the size and number of high brightness areas having predetermined brightness or more extracted by the high brightness area extracting unit satisfies a predetermined condition; and a tunnel identifying unit for identifying a tunnel when the difference in average brightness between the image of the forward area and the image of the obliquely upper area that is calculated by the brightness difference detecting unit is lower than a predetermined value, wherein the vehicle light control device turns on a vehicle lamp when the tunnel identifying unit of the vehicle tunnel detecting device identifies a tunnel.

5. The vehicle light control device according to claim 4, wherein a CPU provided with appropriate processing comprises the obliquely upper area brightness reduction detecting unit, the brightness difference detecting unit and the tunnel identifying unit.

* * * * *